(12) United States Patent
Friggstad

(10) Patent No.: US 8,931,425 B2
(45) Date of Patent: Jan. 13, 2015

(54) METHOD OF PROVIDING SECTIONAL CONTROL DURING SEEDING OF A FIELD USING A FARM IMPLEMENT

(71) Applicant: CNH Industrial Canada, Ltd., Saskatoon (CA)

(72) Inventor: Terrance A. Friggstad, Grasswood (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 0 days.

(21) Appl. No.: 14/224,383

(22) Filed: Mar. 25, 2014

(65) Prior Publication Data

US 2014/0196645 A1  Jul. 17, 2014

Related U.S. Application Data

(62) Division of application No. 12/985,584, filed on Jan. 6, 2011, now Pat. No. 8,701,575.

(51) Int. Cl.

| | |
|---|---|
| *A01C 7/14* | (2006.01) |
| *A01C 7/20* | (2006.01) |
| *A01C 7/12* | (2006.01) |
| *A01C 21/00* | (2006.01) |

(52) U.S. Cl.
CPC . *A01C 7/20* (2013.01); *A01C 7/125* (2013.01); *A01C 21/00* (2013.01)
USPC .......................................................... 111/178

(58) Field of Classification Search
CPC .......... A01C 7/20; A01C 7/125; A01C 21/00
USPC ............................. 111/174–182, 170; 701/50
See application file for complete search history.

(56) References Cited

U.S. PATENT DOCUMENTS

| | | | |
|---|---|---|---|
| 1,783,032 | A | 11/1930 | Ayers |
| 4,359,952 | A | 11/1982 | Gesior et al. |
| 4,664,290 | A | 5/1987 | Martin et al. |
| 5,915,312 | A | 6/1999 | Meyer et al. |
| 6,810,823 | B2 | 11/2004 | Mariman et al. |
| 7,104,207 | B2 | 9/2006 | Wake et al. |
| 7,152,541 | B2 | 12/2006 | Ptacek |
| 7,255,050 | B2 | 8/2007 | Johannaber et al. |
| 7,263,938 | B2 | 9/2007 | Harnetiaux |
| 2009/0314191 | A1* | 12/2009 | Friggstad ...................... 111/178 |

FOREIGN PATENT DOCUMENTS

DE          10028967         12/2001

* cited by examiner

*Primary Examiner* — Christopher J Novosad
(74) *Attorney, Agent, or Firm* — Rebecca L. Henkel

(57) ABSTRACT

A seed metering assembly for a farm implement has a meter roller that can be accessed and removed in a relatively quick manner. The seed metering assembly includes a fluted meter roller that is segmented into a number of discrete fluted sections. Each fluted section has an associated flow control member that is selectively operable to impede the flow of granular material from a seed hopper to its corresponding section of the fluted meter roller.

1 Claim, 12 Drawing Sheets

METHOD OF PROVIDING SECTIONAL CONTROL DURING SEEDING OF A FIELD USING A FARM IMPLEMENT

CROSS-REFERENCE TO RELATED APPLICATION

The present application is a divisional of application Ser. No. 12/985,584 filed Jan. 6, 2011.

BACKGROUND OF THE INVENTION

The present invention relates to farm implements and, more particularly, to a quick-change seed metering assembly capable of sectional control.

Air seeders are commonly towed by tractors to apply seed, fertilizer, or micro-nutrients or any granular product to a field. For purposes of this application "seeding" shall include the application or deposition of any granular or particulate material onto a field. It is generally advantageous to tow an air seeder in combination with a tilling implement, one behind the other, to place the seed and fertilizer under the surface of the soil. An air seeder has as its central component a wheeled seed cart which comprises one or more frame-mounted seed tanks for holding product, generally seed or fertilizer or both. Air seeders also generally include a volumetric metering system operable to measure a fixed volume of seed per unit of linear distance and a pneumatic distribution system for delivering the product from the tank to the soil.

The volumetric metering system is configured for distribution of product from the tank to the distribution headers of the seed tubes. The metering system typically includes a meter roller assembly employing augers or fluted cylinders (meter rollers) situated in a meter box assembly secured below the tank.

Typically the meter box will have a series of outlets known as runs that each leads to the distribution lines of the pneumatic distribution system. The pneumatic distribution system generally includes an air stream operable to carry product metered by the meter roller assembly through the distribution lines to a series of secondary distribution manifolds ("headers"), which in turn distribute product to a group of ground openers mounted on the seeding implement operable to place seed in the ground. The ground openers are configured to evenly deliver the product to the span of ground (the "seedbed") acted upon by the seeding implement.

One of the drawbacks of conventional meter roller assemblies is the difficulty and time required to replace the meter roller assembly in a meter box assembly. As a meter roller assembly will generally have a profile that is suited to a particular type or size of granular material, it can sometimes be required for a farmer to switch-out the meter roller assembly of a meter box assembly between seedings. For example, meter roller assemblies with extra fine profiles are typically used when applying micronutrients or very small seeds such as alfalfa, grass, canola or grain sorghum at very low rates. Fine meter roller assemblies are typically used to apply barley, oats, flax, millet and moderate rates of fertilizer. Coarse rollers are used for high rates of larger seeds such as corn and beans, and for solid seeding, and extra coarse rollers are typically used for larger and fragile seeds like peas and large beans as well as high rates of fertilizer. So as a farmer's seed and/or fertilizer requirements change so too may the need to replace the meter roller assembly with a more appropriate assembly. While conventional meter roller assemblies are generally interchangeable, the construction of such conventional assemblies can make it difficult to perform such a task.

Another drawback of conventional meter roller assemblies is the difficulty in achieving sectional control. Due to the increasing cost of seed and fertilizer, the agronomic disadvantage and waste associated with redundant application of seed and fertilizer, and the increasing size of seed drills, efforts have been made to selectively shut off the flow of granular material to selected distribution lines. Various approaches have been implemented to provide sectional control and with modest success; nevertheless, there remains a need for a meter roller assembly capable of providing sectional control.

SUMMARY OF THE INVENTION

The present invention is directed to seed metering assembly overcoming the aforementioned drawbacks. The seed metering assembly is constructed so that its meter roller can be interchanged as needed with improved efficiency. Moreover, the seed metering assembly includes a fluted meter roller that is segmented into a number of discrete fluted sections. Each fluted section has an associated flow control member that is selectively operable to impede the flow of granular material from a seed hopper to its corresponding section of the fluted meter roller.

The flow control member can take many forms. In one form, the flow control member includes an arm having a curved member that when placed between a corresponding section of the fluted meter roller and the discharge end of the seed hopper substantially slows the flow of granular material through the corresponding section of the meter roller. The arm is movable by a linkage to pivot the arm, and thus the curved member.

The fluted meter roller is contained in a bulkhead that is positioned adjacent the discharge end of the seed hopper. The bulkhead has a set of discharge ports that are in fluid communication with distribution lines. The bulkhead also has a drainage port and a drain panel that selectively opens and closes the draining port. When the drainage port is open, granular material can be drained from the seed hopper. In one embodiment, the drainage port is sized such that the meter roller may be removed from bulkhead through the open port. In another embodiment, the bulkhead has an access panel that selectively opens and closes an access opening formed in the bulkhead generally opposite the drainage port. In this embodiment, the meter roller may be removed from the bulkhead through the access opening. The meter roller is rotatably mounted to the bulkhead by a pair of bearing assemblies.

The bulkhead also includes a series of dividers that prevent the flow of granular material between adjacent sections of the fluted meter roller.

Other objects, features, aspects, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE FIGURES

Preferred exemplary embodiments of the invention are illustrated in the accompanying drawings in which like reference numerals represent like parts throughout.

In the drawings.

DETAILED DESCRIPTION

Figure 1:
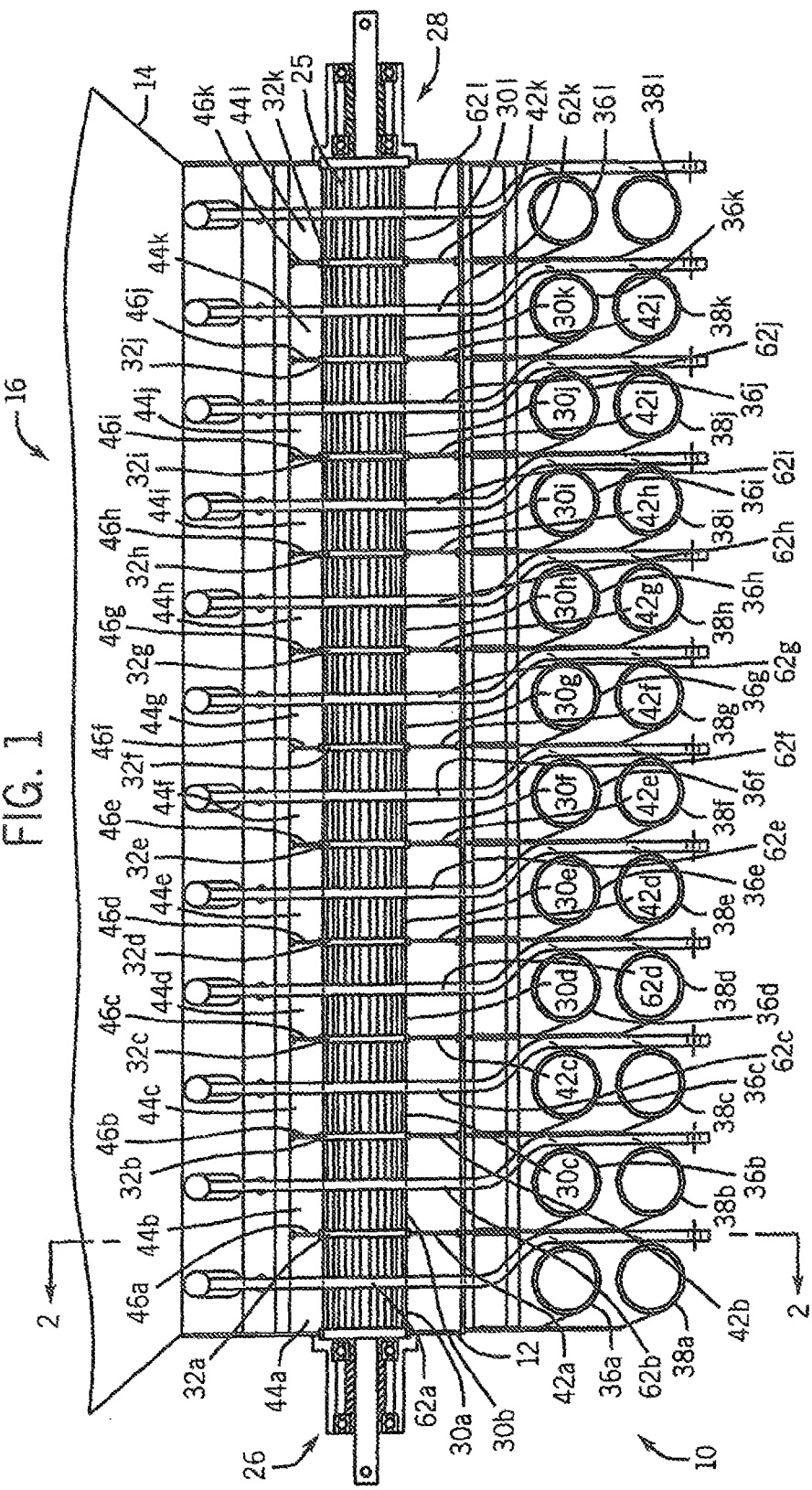
FIG. 1 is a front elevation view of a seed metering assembly according to one embodiment of the invention.
Figure 2:
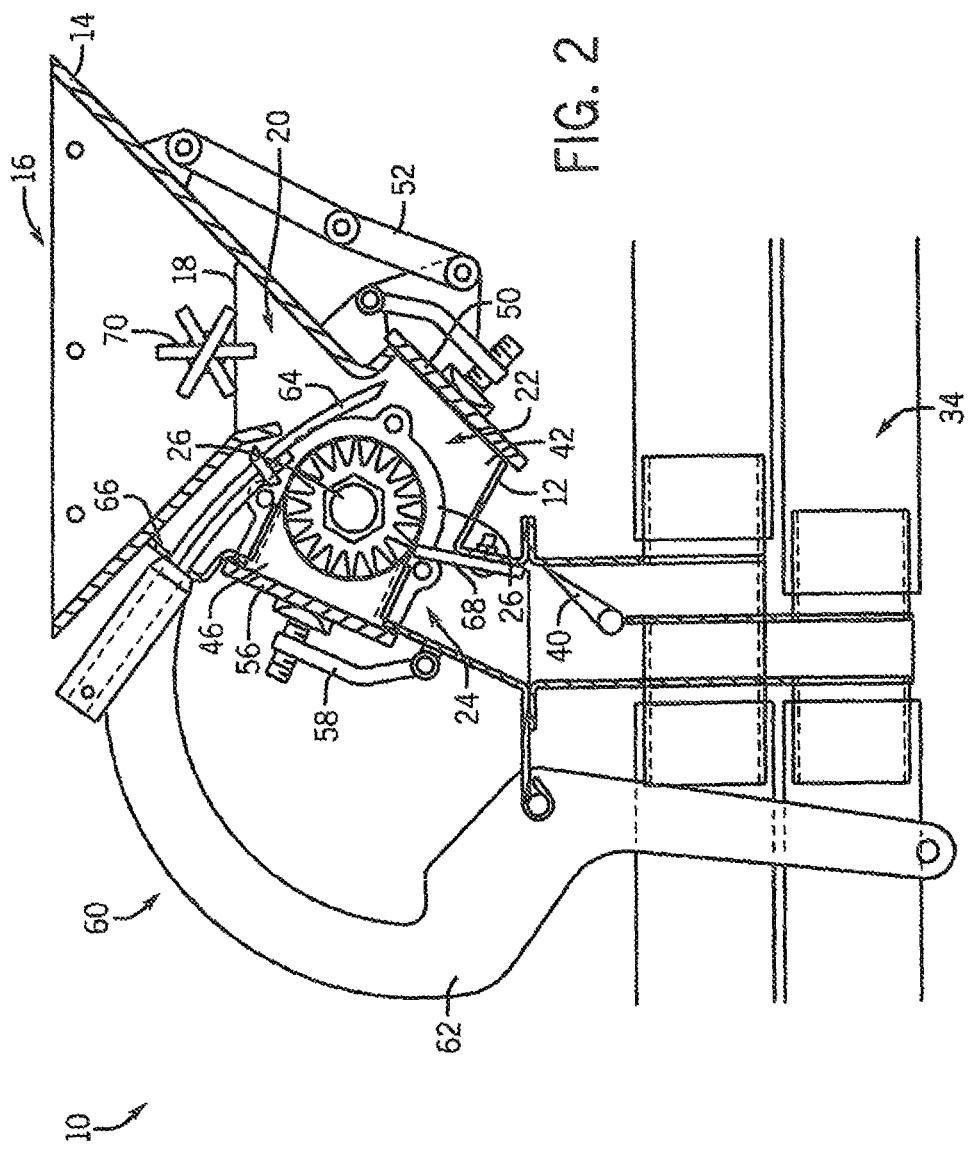
FIG. 2 is a side elevation view of the seed metering assembly of FIG. 1.

Turning now to FIGS. 1 and 2, a seed metering assembly 10 for an air seeder (not shown) includes a bulkhead 12 mounted adjacently below a hopper 14. The hopper 14, which is of conventional construction, has a feed end 16 which allows seed or other granular material to be loaded into the hopper and a discharge end 18 having an opening 20 for passing granular material from the hopper 14 to the bulkhead 12. The bulkhead 12 defines a cavity 22 containing a meter roller assembly 24.

Figure 3:
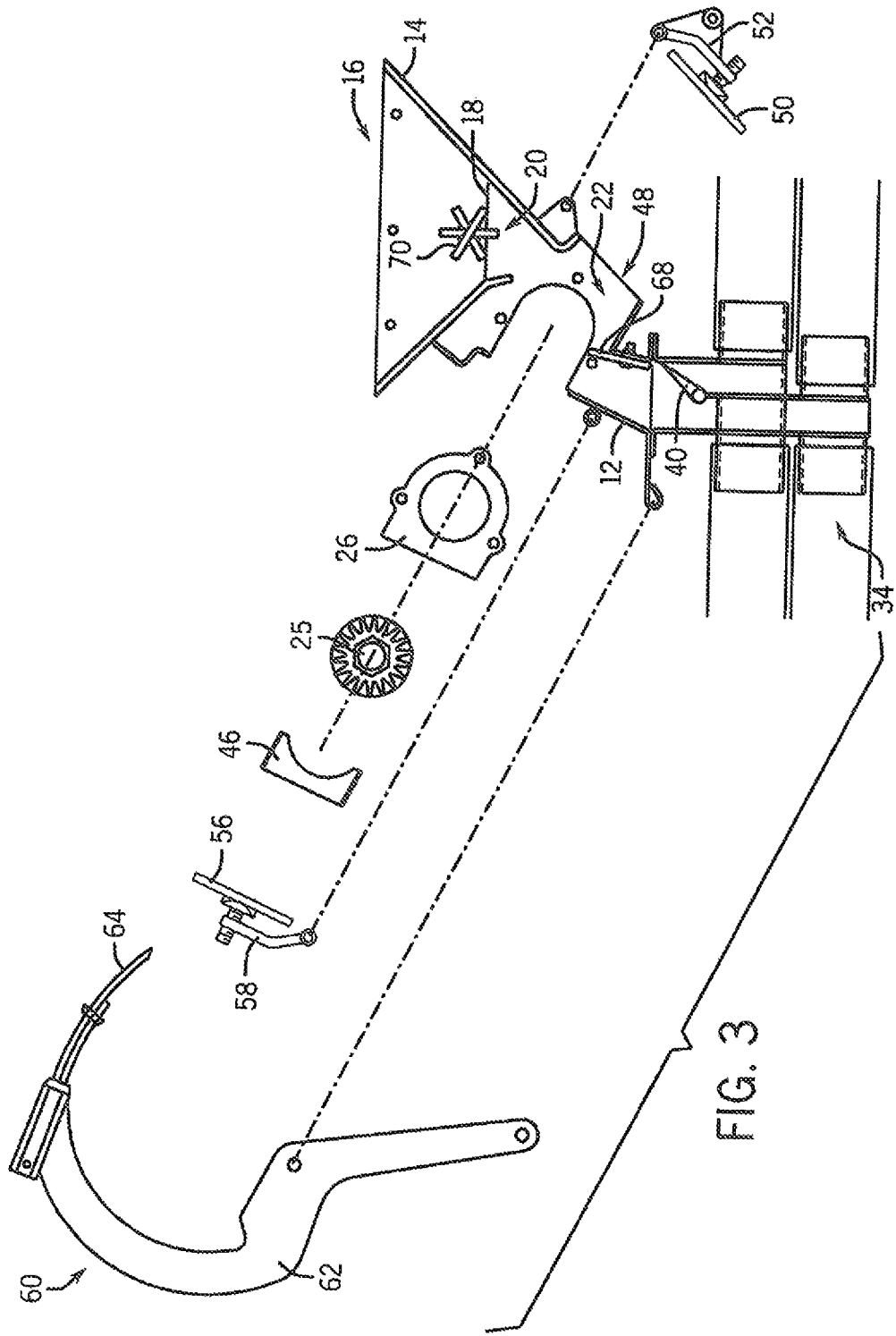
FIG. 3 is an exploded view of the seed metering assembly of FIG. 1.

With additional reference to FIG. 3, the meter roller assembly 24 includes a rotor 25 that is rotatably mounted to bulkhead 24 by bearing assemblies 26, 28. The engagement of opposed ends of the rotor 25 with the bearing assemblies 26, 28 allows the rotor to rotate within the bulkhead 12. Formed along the length of the rotor 25 are several discrete fluted sections 30a-l, with adjacent fluted sections spaced from another by blank (non-fluted) sections 32a-k. It will be appreciated that the invention is not limited to any particular flute profile. As known in the art, when the rotor 25 rotates, the fluted sections 30a-l capture granular material as it falls from the hopper 14 and passes the captured granular material to a distribution network 34. The distribution network 34 has two sets of distribution runs 36a-l and 38a-l, with each discrete fluted section designed to feed granular material to a pair of distribution runs. For example, discrete fluted section 30a provides granular material to distribution runs 36a and 38a. Each pair of distribution runs has a diverter valve 40 that allows flow to one of the runs to be closed, if desired.

Referring briefly back to FIG. 1, the bulkhead 12 includes bulkhead dividers 42a-k along the length of the bulkhead 12. The bulkhead dividers align with the blank or non-fluted sections of the meter roller assembly 26. The bulkhead dividers partition the cavity 22 into several sub-cavities 44a-l along the length of the bulkhead 12. Each sub-cavity is thus associated with a respective one of the fluted sections of the meter roller assembly 26. The bulkhead dividers segregate neighboring sub-cavities from one another and thus create a barrier against granular material passing between sub-cavities.

In addition to the bulkhead dividers 42a-k, U-shaped divider clips 46a-k slide onto the bulkhead dividers 42a-k after the rotor 25 is loaded into the bulkhead 12. As will be described in greater detail below, the rotor 25 may be removed from the bulkhead in a relatively quick and efficient manner. To facilitate this removal, when the clips are detached from the divides, the rotor 25 can be lifted out of the bulkhead. When the rotor is loaded into the bulkhead, the clips are slid onto their individual bulkhead dividers to complete the partitioning of the bulkhead cavity into the aforementioned sub-cavities. In a preferred embodiment, the divider clips slide onto the bulkhead dividers, but it is understood that other types of attaching could be used.

Figure 6:
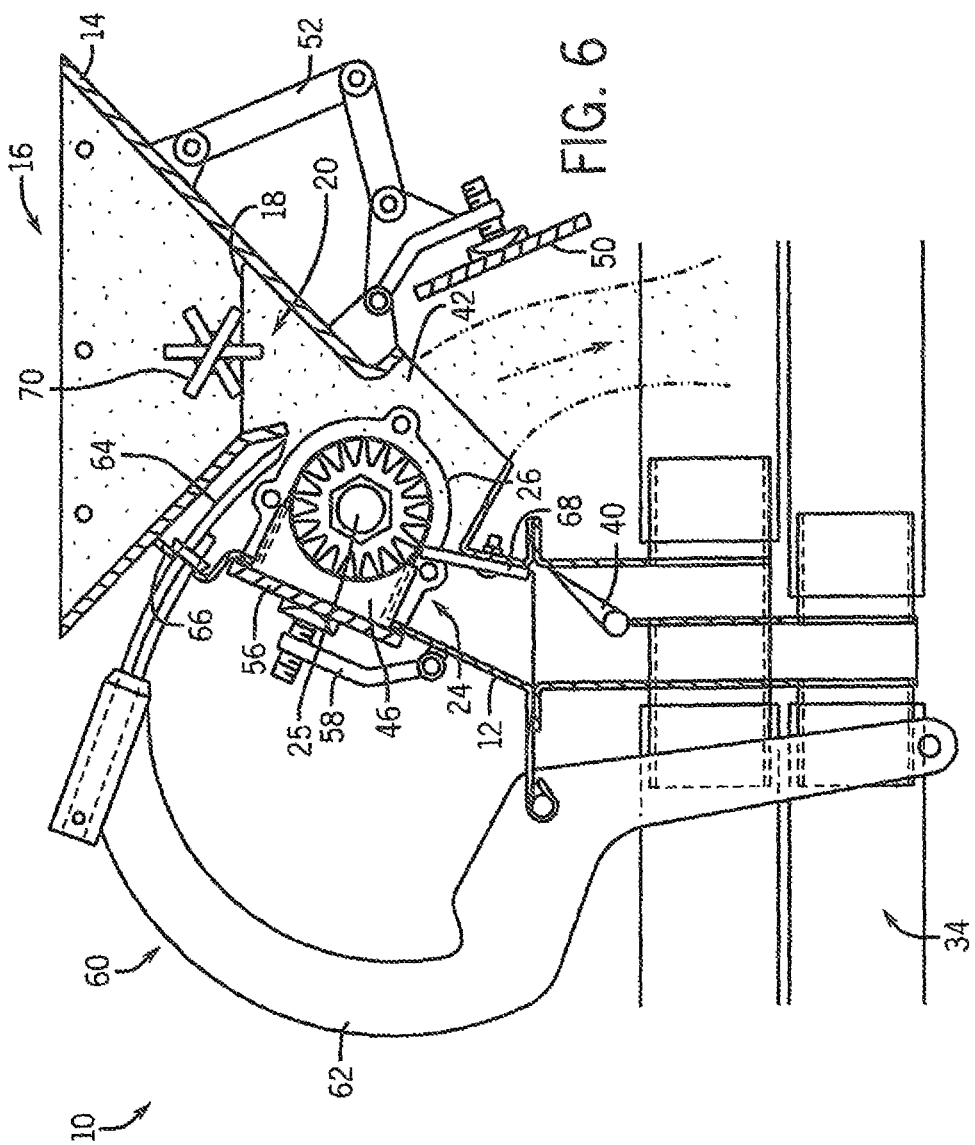
FIG. 6 is a section view of the seed metering assembly of FIG. 1 shown with a drain panel in an open position for draining the seed metering assembly of granular product.

The meter housing 14, in one preferred embodiment, has a pair of service openings. One service opening is a drain port 48 that is formed in the lower end of the meter housing 14. The drain port 48, when opened, allows granular material to be drained from the hopper and meter housing, as best shown in FIG. 6. The drain port 48 is selectively opened and closed by a drain door or panel 50 that is pivotably mounted to the hopper 14 by linkage 52.

Figure 7:
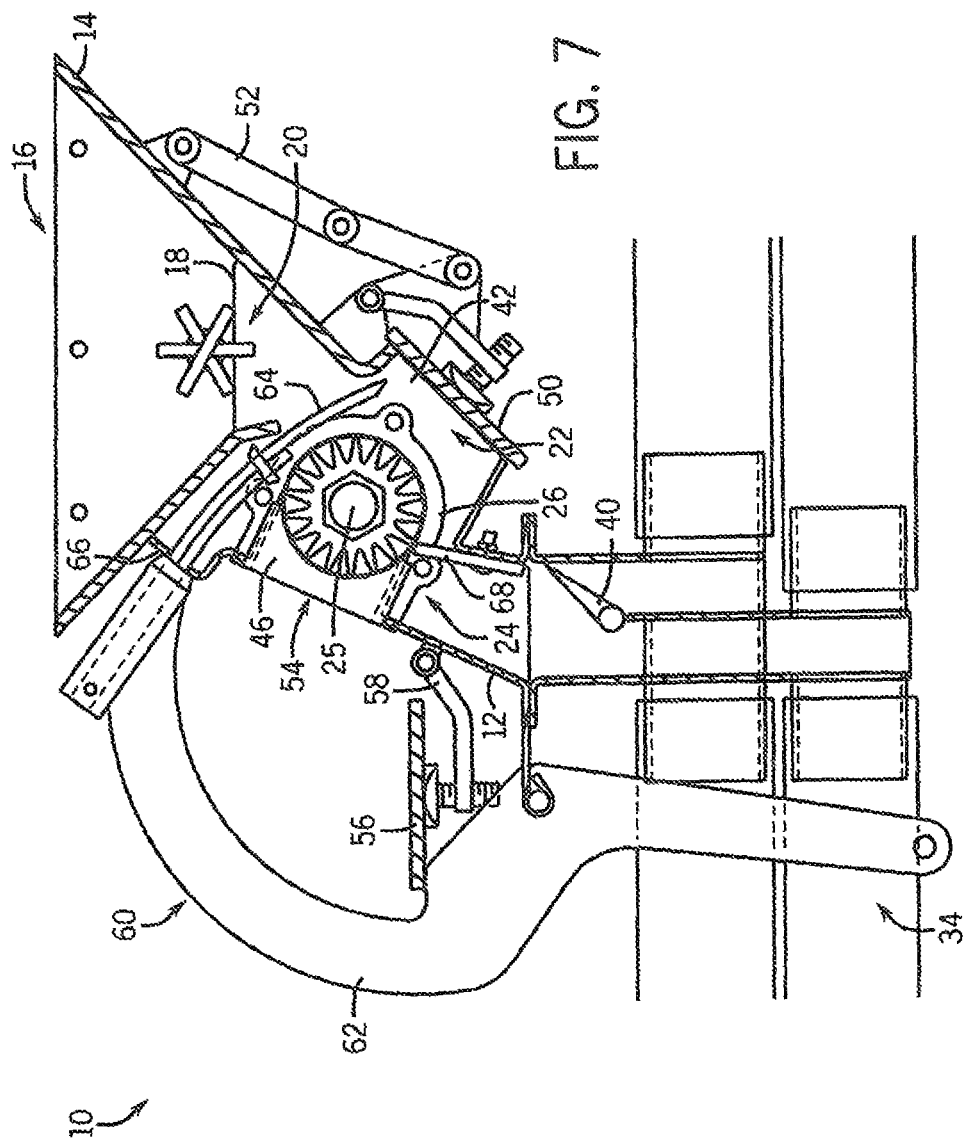
FIG. 7 is a section view of the seed metering assembly of HG. 1 shown with a rotor access panel in an open position for removing the roller assembly from a bulkhead of the seed metering assembly of FIG. 1.

With reference to FIG. 7, generally opposite the drain port 48 is an access opening 54. The access opening 54 is sized to allow removal of the rotor 25 when disconnected from the rotor bearings 26, 28. The access opening 54 is opened and closed by an access panel 56 that is pivotably mounted to a lower end of the bulkhead 12 by linkage 58.

Figure 8:
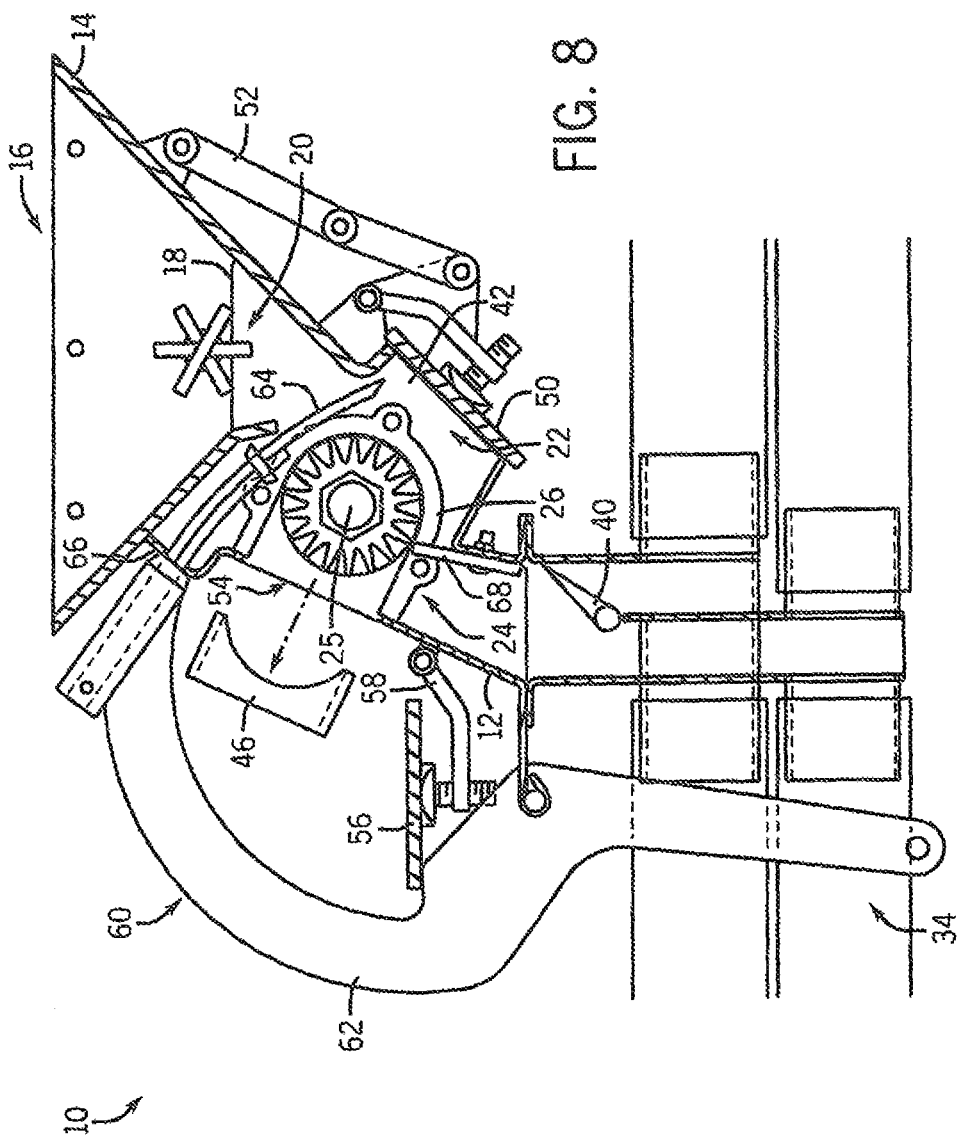
FIGS. 8-10 are section views of the seed metering assembly of FIG. I illustrating stages of removing the meter roller assembly from the seed metering assembly.
Figure 9:
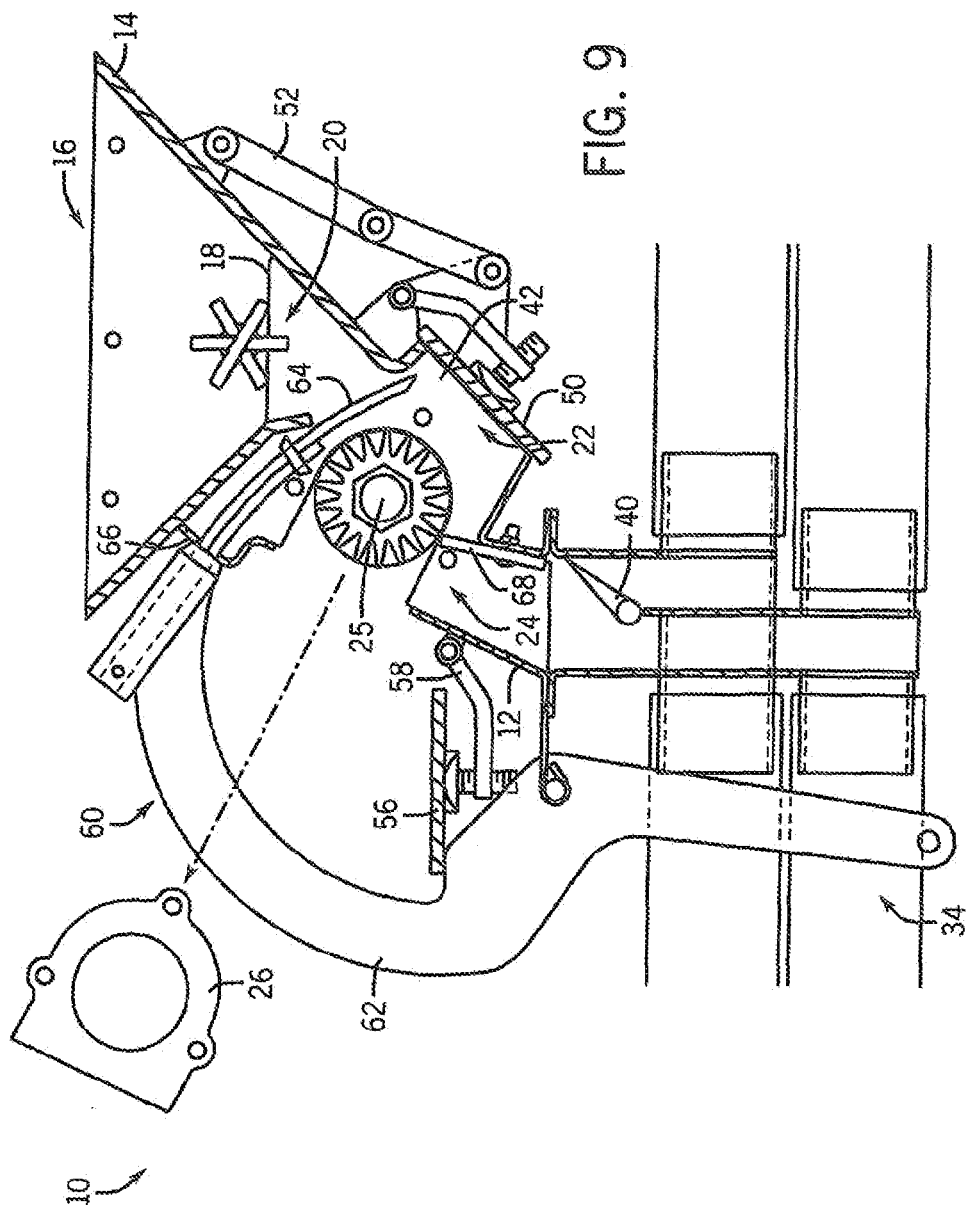
Figure 10:
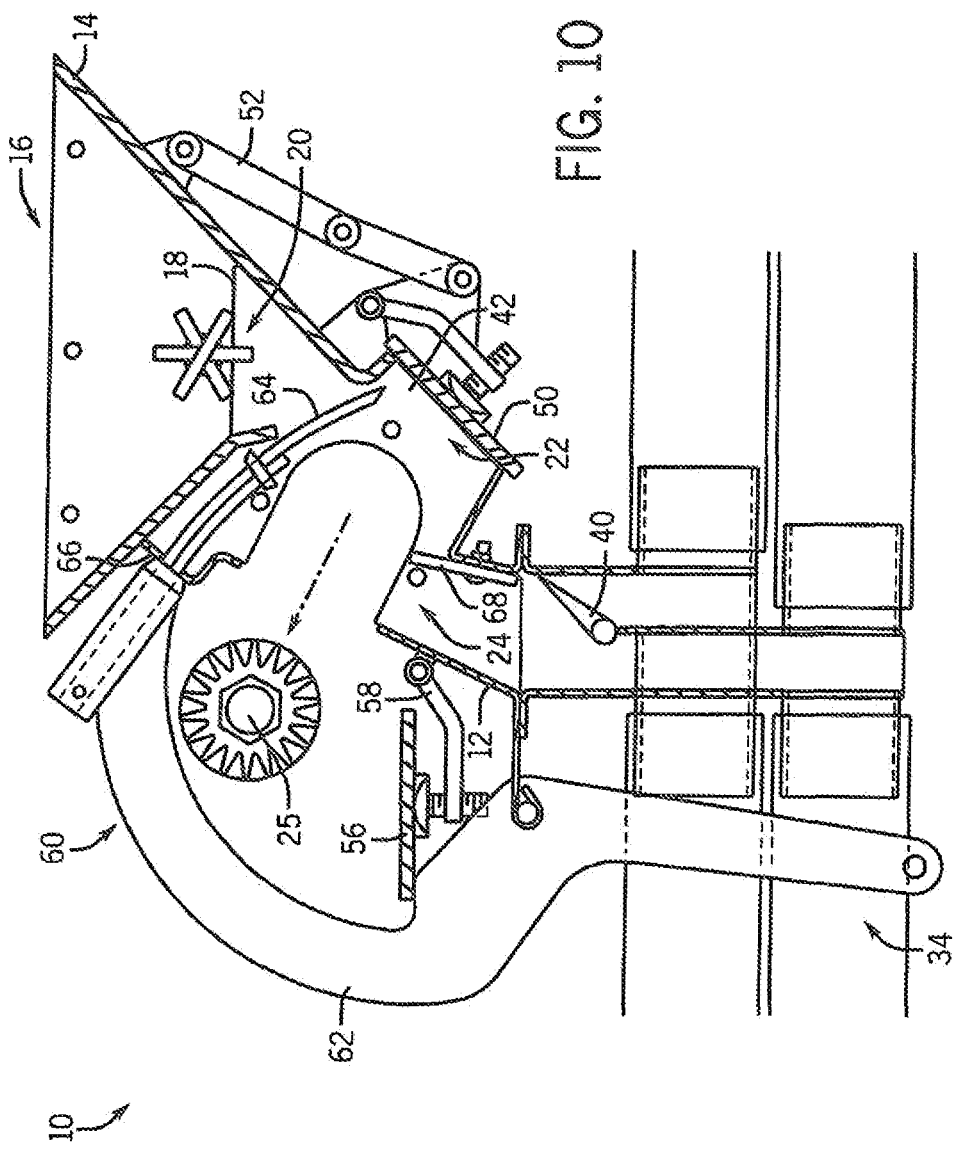
Figure 11:
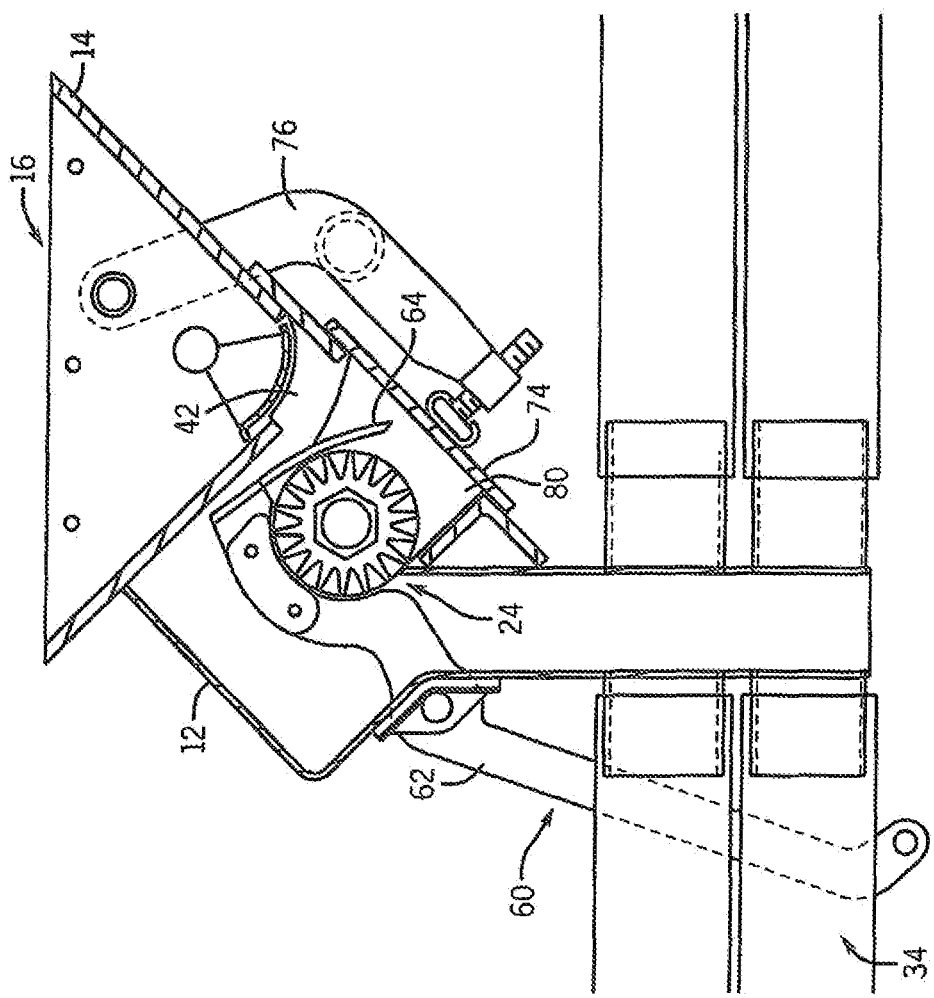
FIG. 11 is a section view of a seed metering assembly according to an alternate embodiment of the invention.

From the foregoing, it will be appreciated that the present invention provides a metering assembly in which the meter roller assembly can be quickly interchanged with a rotor having another profile. More particularly and with reference to FIGS. 8-10, the rotor 25 can be replaced in a relatively straightforward manner. In a first step, the access panel 56 is moved to the open position by pivoting linkage 58. The linkage 58 can be done manually or in a mechanized manner using one of any known means. With the access panel 56 in the open position, which is shown in FIG. 8, the cavity of the meter housing is exposed. This allows an operator to remove the U-shaped divider clips from engagement with the bulkhead dividers 42. Next, one of the bearing housings, e.g., bearing housing 26, is disengaged from its respective end of the rotor 25, as shown in FIG. 9. It will be appreciated that the bearing housings 26, 28 engaged ends of the rotor 25 in a conventional manner. With one of the bearing housings removed, the rotor can be slid linearly away from the other bearing housing. Alternately, the other bearing housing could be removed in a manner similar to the removal of the first bearing assembly. With the rotor 25 dislodged from engagement with the hearing assemblies 26, 28, the rotor can then be lifted out of the meter housing 12 as shown in FIG. 10. The rotor, or a replacement rotor, can be then placed into the meter housing 12 and secured to the bearing housings in a conventional manner then the divider clips can be reinstalled and the access panel 56 may then be moved to the closed position.

Figure 4:
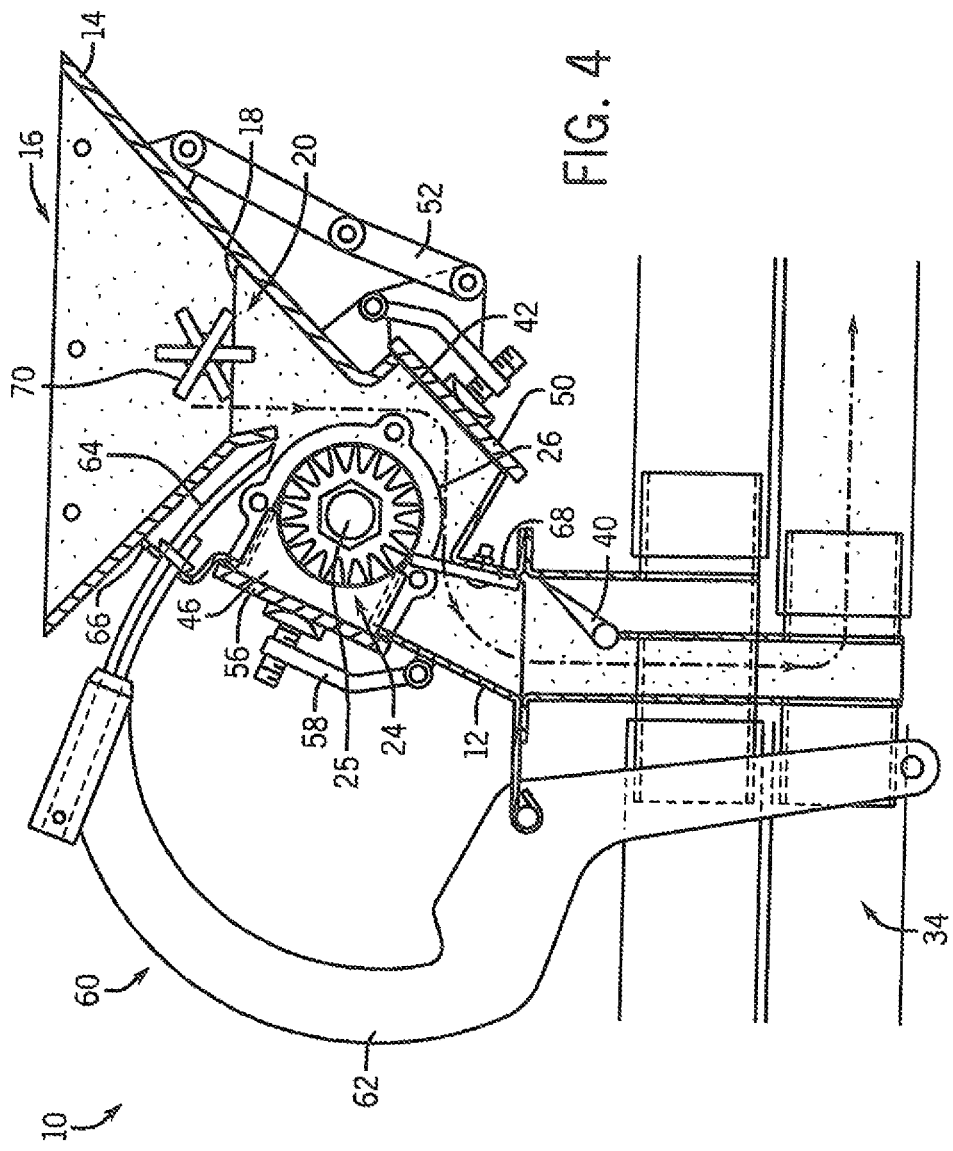
FIG. 4 is section view of the seed metering assembly of FIG. 1 shown when operating to meter seed to a set of distribution lines.

In addition to providing a quick-change metering assembly, the present invention also provides a series of sectional shut-off assemblies 60. There is a shut-off assembly 60a-l for each fluted section of the meter roller assembly. Each shut-off assembly 60 has a control arm 62 and a concave curved member 64. Each control arm 62 is pivotably coupled to the bulkhead 12 and movable between first and section positions by a respective drive linkage (not shown). In one embodiment, when the air cart is equipped with more than one meter, two or more meters can be controlled by one control or actuator arm with a connector link joining the shut-off assemblies of the corresponding runs so that granular flow from each of the meters to a shared run is stopped at the same time. In the first or open position, which is shown in FIG. 4, the curved members are moved out of the meter housing 12. It will be appreciated that the bulkhead 12 has a series of guide plates 66 and each curved member slides along its respective guide plate when being moved between the first and the second positions.

Figure 5:
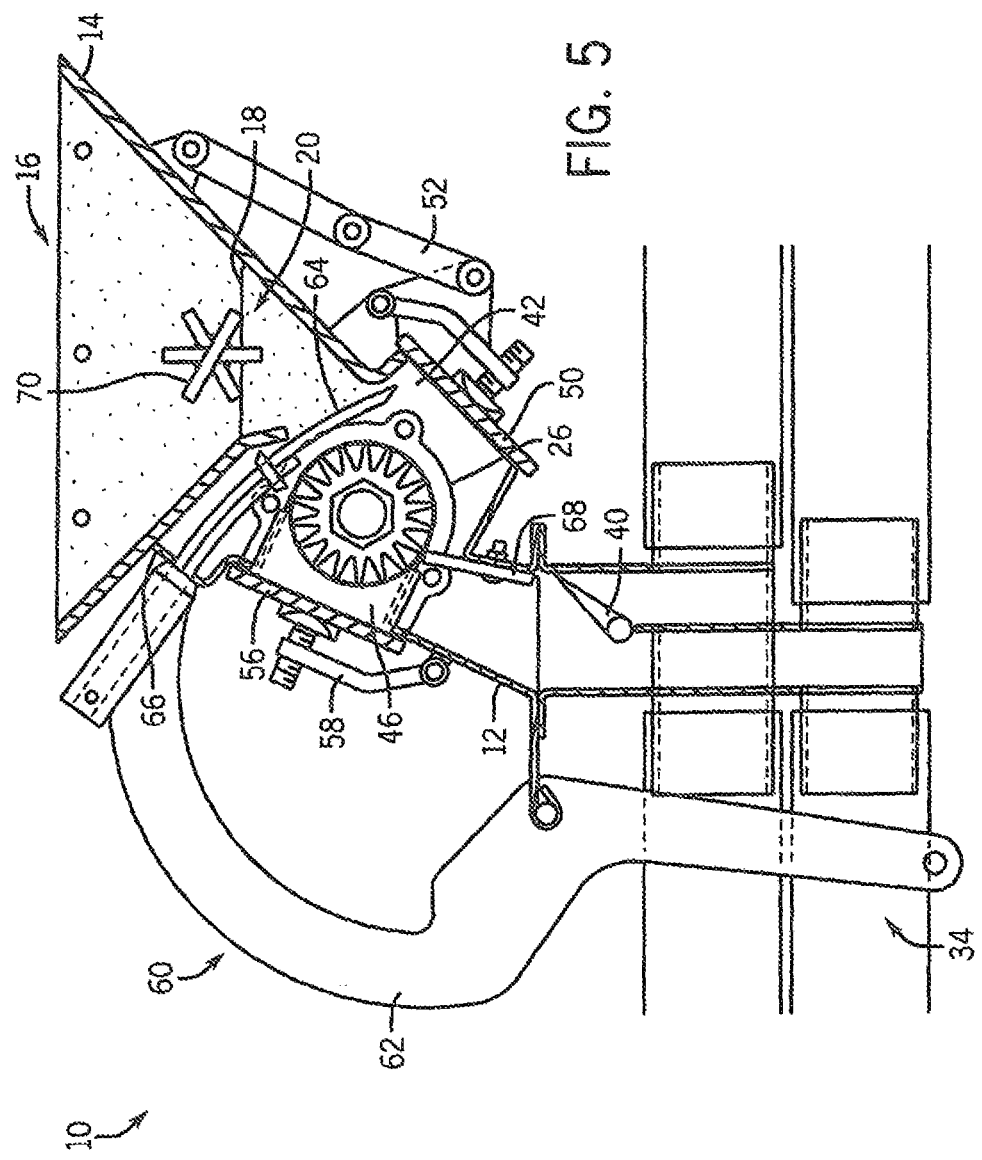
FIG. 5 is a section view of the seed metering assembly of FIG. 1 shown with a sectional flow control gate in a closed position to prevent the flow of granular material to meter roller assembly of the seed metering assembly of FIG. 1.

Each curved member 64 has a width that is substantially equal to the width between the bulkhead dividers framing the sub-cavity. Thus, when the shut-off assembly is moved to the lowered or closed position, which is shown in FIG. 5, the curved member 64 is disposed between the meter roller assembly 24 and the discharge opening 20 of the hopper 16. In one embodiment, the curved members are spaced less than 2 cm from their respective fluted sections of the metering device when in the second position and, more preferably, less than 1 cm from the metering device. Thus, when a curved member 64 is between its respective portion of the meter roller assembly 24 and a respective portion of the discharge opening 20, flow to the corresponding fluted section of the rotor 25 will slow substantially and, preferably, stop altogether. It will be appreciated that when the curved member is in the lowered or closed position, there may be a small gap between the curved member and the fluted rotor 25. In this regard, the "opening" between the section of the fluted rotor and the discharge opening of the hopper may not be completely "closed" but the position of the curved member is below the angle of repose of the granular material so that the meter housing cannot be filled and presented to the air stream. This "starving" of the respective section of the fluted roller is sufficient to stop the flow of granular material to the distribution runs associated with the starved section of the meter roller assembly. As shown in FIG. 4, the bulkhead has a raised edge 68 disposed between the meter roller assembly and the lower end of the bulkhead. For the granular material to be passed to the distribution runs, it must pass over the raised edge 68. As known in the art, there is a relatively small gap (not shown) between the raised edge and the lower end of the meter roller assembly. When a section of the fluted rotor is being starved by its shut-off gate assembly being in the lowered, closed position, there will not be enough granular material that is allowed to pass into the sub-cavity associated with the starved fluted rotor to provide a material buildup sufficient to pass over the raised edge.

In a preferred embodiment, an agitator 70 is placed inside the hopper to provide agitation of the granular material.

Figure 12:
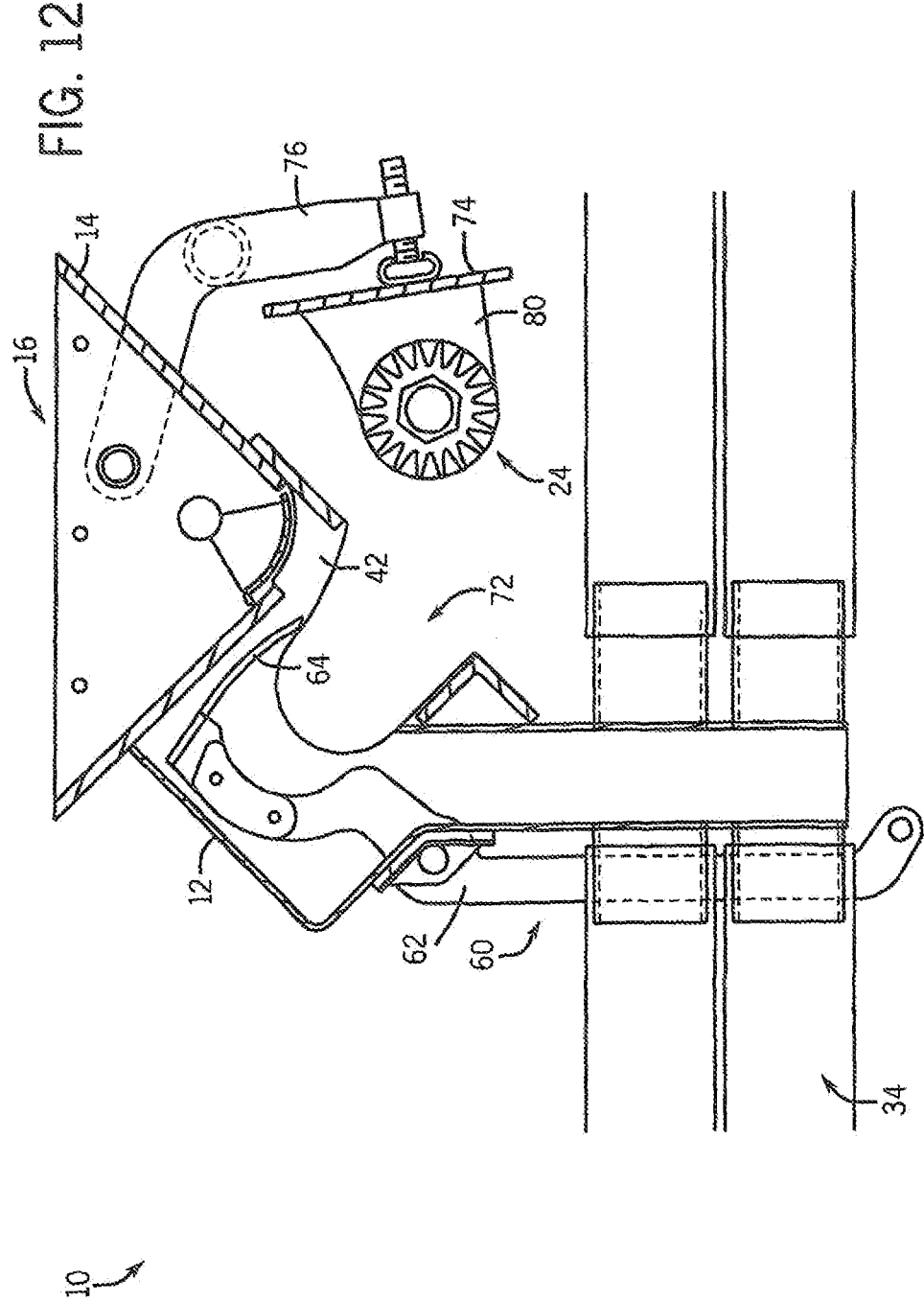
FIG. 12 is a section w of the seed metering assembly of FIG. 11 with a drain panel in an open position for draining granular material from the seed metering assembly.

In an alternate embodiment of the present invention, a single service opening 72 is formed on the lower end of the bulkhead 12 generally beneath the meter roller assembly 24. The single service opening 72 functions as both a drain port and as a service entrance. The service opening 72 is opened and closed by a service door 74 that is movable by a drive arm 76 that is pivotably coupled to the hopper 14. The rotor 25 is mounted to the service door 74 by bearing end caps, of only which cap 80 is viewable in the figures. Thus, when the service door 74 is moved away from the bulkhead 12, as shown in FIG. 12, to open the service opening 72, the hopper and meter housing can be drained and/or the rotor can be serviced or replaced.

It will therefore be appreciated that the present invention provides a seed metering assembly that improves upon the prior art. The assembly provides a curved shut-off member that when pivoted to a closed or lowered position to provide sectional control. The curved member is constructed to pass easily through the meter housing cavity and very close to the meter roller thereby creating a small remaining volume, and thus has a quick response time from actuation to stoppage of material flow. In one embodiment, the meter roller and the bearings are mounted to a service door for bottom removal of the roller meter assembly and draining of the hopper/meter housing. In another embodiment, the meter housing may have two service openings. One service opening for top removal of the roller meter housing and another service opening for draining the hopper and meter housing. The invention also provides a meter housing with substantial separation between fluted sections of a fluted meter roller to reduce cross-flow between adjacent fluted sections, such as may otherwise occur because of uneven air distribution and flow.

Many changes and modifications could be made to the invention without departing from the spirit thereof. The scope of these changes will become apparent from the appended claims.

The invention claimed is:

1. A method of providing sectional control during seeding of a field using a farm implement having a hopper that holds a volume of granular material and has a discharge opening through which the granular material to exit the hopper, the method comprising:

rotating a fluted metering roller as granular material passes through the discharge opening of the hopper, the fluted metering roller having a number of fluted sections formed along a length of the roller; and selectively moving at least one of a number of flow control devices to a position between the discharge opening of the hopper and the fluted metering roller, each flow control device associated with a respective fluted section of the number of fluted sections and wherein each flow control device having a curved member, being associated with a respective one of the number of fluted sections and being independently movable between a first position in which granular material is permitted to be fed from the discharge opening of the hopper to the respective one of the number of fluted sections at a flow rate and a second position in which the curved member of the flow control device is placed between the respective one of the number of fluted sections and a portion of the discharge opening of the hopper generally aligned with the respective one of the number of fluted sections to cause flow of particulate material to the respective one of the plurality of fluted sections of the metering device to be substantially blocked.

* * * * *